United States Patent
Saeedi et al.

(10) Patent No.: US 9,935,718 B1
(45) Date of Patent: Apr. 3, 2018

(54) FEED-FORWARD DC-BIAS ACQUISITION FOR BURST-MODE OPTICAL RECEIVERS

(71) Applicant: Oracle International Corporation, Redwood Shores, CA (US)

(72) Inventors: Saman Saeedi, Redwood City, CA (US); Frankie Y. Liu, Palo Alto, CA (US); Suwen Yang, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/369,568

(22) Filed: Dec. 5, 2016

(51) Int. Cl.
| | | |
|---|---|---|
| *H04B 10/00* | (2013.01) | |
| *H04B 10/61* | (2013.01) | |
| *G01J 1/46* | (2006.01) | |
| *G01J 1/44* | (2006.01) | |

(52) U.S. Cl.
CPC .............. *H04B 10/616* (2013.01); *G01J 1/46* (2013.01); *G01J 2001/446* (2013.01)

(58) Field of Classification Search
CPC ...... H04B 10/616; G01J 1/46; G01J 2001/446
USPC ........................................................ 398/202
See application file for complete search history.

(56) References Cited

U.S. PATENT DOCUMENTS

| | | | | |
|---|---|---|---|---|
| 9,819,421 | B1 * | 11/2017 | Xie ...................... | H04B 10/691 |
| 2005/0232637 | A1 * | 10/2005 | Paillet ................... | H04B 10/66 398/140 |
| 2005/0281565 | A1 * | 12/2005 | Duanmu .............. | H04B 10/695 398/214 |
| 2014/0029958 | A1 * | 1/2014 | Takahashi ............ | H04B 10/695 398/202 |
| 2015/0372648 | A1 * | 12/2015 | Sugimoto ............ | H04B 10/272 330/2 |
| 2017/0075081 | A1 * | 3/2017 | Luk ...................... | G02B 6/4225 |

* cited by examiner

*Primary Examiner* — Juan A Torres
(74) *Attorney, Agent, or Firm* — Park, Vaughan, Fleming & Dowler LLP

(57) ABSTRACT

An optical receiver receives a photocurrent from a photosensor and uses a transimpedance element to convert the photocurrent into an input voltage signal. An amplifier then amplifies the input voltage signal to produce a receiver output. During this process, a reference-voltage-generation circuit generates a reference voltage for the amplifier. This reference-voltage-generation circuit includes a data-detection circuit that detects data on the input voltage signal, and an adjustable low-pass filter, which filters the input voltage signal to produce the reference voltage. During a faster operating mode, which occurs when the data-detection circuit does not detect data on the input voltage signal, the filter has a cutoff frequency $f_1$. During a slower operating mode, which starts a bias-delay time $t_{BD}$ after the data-detection circuit detects data on the input voltage signal, and lasts until the data-detection circuit no longer detects data, the filter has a lower cutoff frequency $f_2$.

20 Claims, 5 Drawing Sheets

FEED-FORWARD DC-BIAS ACQUISITION FOR BURST-MODE OPTICAL RECEIVERS

BACKGROUND

Field

The disclosed embodiments relate to the design of an optical receiver. More specifically, the disclosed embodiments relate to the design of a burst-mode optical receiver, which includes a feed-forward circuit that acquires a DC-bias signal level to provide a reference voltage for the optical receiver.

Related Art

Silicon photonics is a promising new technology that can potentially provide large communication bandwidth, low latency and low power consumption for inter-chip and intra-chip communications within data centers. In order to achieve low-latency, high-bandwidth optical connectivity, a variety of optical components need to be developed, including: optical modulators, optical multiplexers/demultiplexers and optical receivers.

In particular, the development of high-performance optical receivers presents a number of design challenges. During operation, an optical receiver obtains a photocurrent from a photo detector, and converts it into an amplified voltage signal. During this conversion process, the optical receiver extracts an embedded direct-current (DC)-bias signal from the photocurrent, and uses this DC-bias signal as a reference voltage to determine when a high-level signal or a low-level signal is being received from the photo detector.

Recent developments in energy efficiency for data centers are increasing requirements for optical receivers to acquire DC signal levels rapidly. Data centers presently consume large amounts of power. In fact, typically, a large data center containing thousands of servers can consume about 20 million watts of power, which is sufficient to power a small town. In order to reduce this power consumption, there is presently a push to transition to "energy-proportional" communication links, which can be turned off to save power when there is no data to transmit. However, in order to make such energy-proportional communication links practical, burst-mode optical receivers need to be developed, which are able to rapidly turn on and off. Unfortunately, existing burst-mode optical receivers require a significant amount of time to initially acquire DC-bias signal levels when they are turned on. For example, an exemplary 25 Gb/s optical receiver requires about 13 nanoseconds to acquire a DC-bias signal level, which means that several hundred data bits, which could have been transmitted during the 13 nanoseconds, are essentially wasted.

Hence, what is needed is a new optical receiver design that is able to rapidly extract an embedded DC-bias signal level without requiring a significant amount of acquisition time.

SUMMARY

The disclosed embodiments relate to the design of an optical receiver. This optical receiver has an input that receives a photocurrent from a photosensor, wherein the input is coupled to a transimpedance element, which converts the photocurrent into an input voltage signal. Next, a receiver amplifier amplifies the input voltage signal to produce a receiver output. During this process, a reference-voltage-generation circuit generates a reference voltage for the receiver amplifier, wherein the reference-voltage-generation circuit comprises a feed-forward stage, which includes a data-detection circuit that detects data on the input voltage signal, and an adjustable low-pass filter, which filters the input voltage signal to produce the reference voltage. During a faster operating mode, which occurs when the data-detection circuit does not detect data on the input voltage signal, the adjustable low-pass filter has a cutoff frequency $f_1$. In contrast, during a slower operating mode, which starts a bias-delay time $t_{BD}$ after the data-detection circuit detects data on the input voltage signal, and lasts until the data-detection circuit no longer detects data on the input voltage signal, the adjustable low-pass filter has a lower cutoff frequency $f_2$.

In some embodiments, $f_1$ is less than a frequency of a preamble of a data transmission received on the input voltage signal.

In some embodiments, $f_2$ is slow enough to ensure that a maximum number of same-sign consecutive bits in a data transmission received on the input voltage signal does not adversely affect reception of data by the optical receiver.

In some embodiments, the adjustable low-pass filter includes a resistance R and two capacitances $C_1$ and $C_2$. During the faster operating mode, R and $C_1$ are connected within the adjustable low-pass filter so that the cutoff frequency $f_1$ is approximately $1/RC_1$. During the slower operating mode, R and $C_1$, and $C_2$ are connected within the adjustable low-pass filter so that the cutoff frequency $f_2$ is approximately $1/R(C_1+C_2)$.

In some embodiments, the adjustable low-pass filter includes a filter resistor coupled between the receiver input and an intermediate filter node, wherein the filter resistor has a resistance R. It also includes a first filter capacitor, which is coupled between the intermediate filter node and ground, wherein the first filter capacitor has a capacitance $C_1$. The adjustable low-pass filter also includes a filter amplifier having a first input, a second input and a filter-amplifier output, wherein the first input is coupled to the filter-amplifier output, wherein the second input is coupled to the intermediate filter node, and wherein the filter-amplifier output feeds into a reference-voltage input of the receiver amplifier. The filter-amplifier output is also coupled through a second filter capacitor to ground, wherein the second filter capacitor has a capacitance $C_2$. Finally, a filter switch is coupled between the second input of the filter amplifier and the filter-amplifier output. This filter switch is operated by a controller, which receives a data-detected signal from the data-detection circuit, and in response actuates the filter switch to couple the second input of the filter amplifier to the filter-amplifier output.

In some embodiments, the controller turns off the filter amplifier during the slower mode of operation.

In some embodiments, the bias-delay time $t_{BD}$ is sufficiently long to ensure that the reference voltage stabilizes after the data-detection circuit starts detecting data on the input voltage signal In some embodiments, the receiver amplifier comprises a chain of high-speed amplifier stages, which are coupled output to input.

In some embodiments, the photosensor comprises a photodiode that converts an optical signal into the photocurrent.

DETAILED DESCRIPTION

Figure 1:
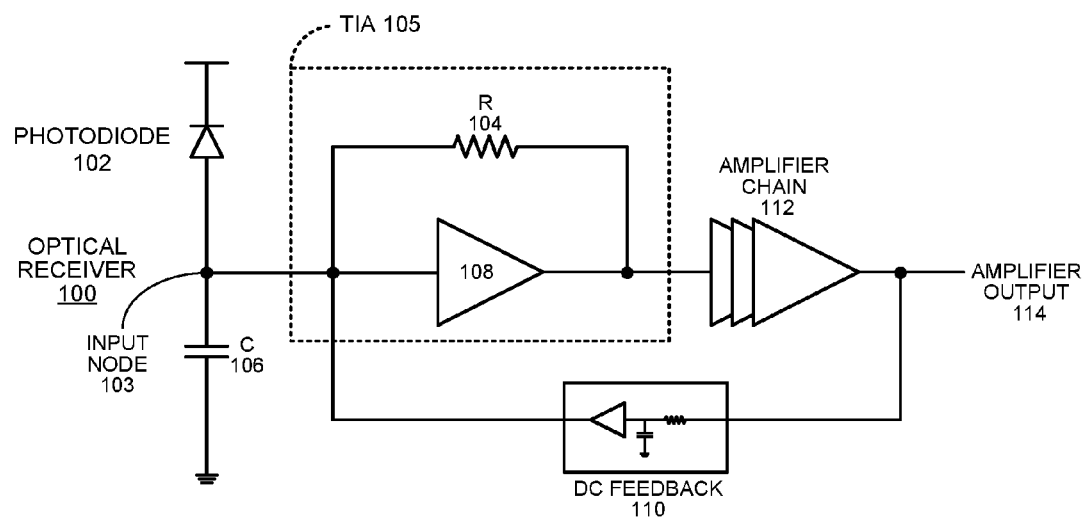
FIG. 1 illustrates an optical receiver with a transimpedance amplifier and conventional feed-back DC acquisition.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

IMPLEMENTATION DETAILS

As mentioned above, there is presently a push to transition data centers to "energy proportional" communication links, which can be turned off to save power when there is no data to transmit. However, to make such energy proportional communication links practical, we need to develop components that can rapidly turn on to minimize delays for communications across the links. To further this goal, it is desirable to minimize the amount of time it takes an optical receiver to acquire a DC-bias reference signal. In an optical switch, an incoming optical signal can come from different lasers, and the average power of each laser may be different. So an optical receiver needs to be able to quickly adjust its DC bias to account for these differences in average power.

Conventional optical receivers commonly use a voltage-to-current converter known as a transimpedance amplifier (TIA) to convert a photocurrent into a corresponding voltage signal. For example, FIG. 1 illustrates a conventional optical receiver 100, which receives an optical signal from a photodiode 102 at an input node 103, wherein input node 103 has input capacitance C 106 that arises from a parasitic capacitance and a junction capacitor of photodiode 102. This input capacitance C 106 sees the input resistance of TIA 105, which comprises a feedback resistance R 104 and an amplifier 108. The output of TIA 105 feeds into an amplifier chain 112, which amplifies a voltage signal from the output of TIA 105 to produce an amplifier output 114. There is also a feedback loop from amplifier output 114 back to input node 103 through an intervening DC feedback circuit 110 to adjust a DC bias for TIA 105.

The input resistance of optical receiver 100 is determined by the input resistance of TIA 105, which is simply the feedback resistance R 104 divided by A, wherein A is the gain of the amplifier 108. However, as technology continues to advance, the gain of such amplifiers is decreasing, although the bandwidth is becoming larger and the parasitic capacitances are becoming smaller. This reduction in gain makes the input resistance of TIA 105 higher. Note that the input resistance of optical receiver 100 times its input capacitance C 106 creates the dominant pole associated with the input node 103, and TIA 105 is used to decrease this input resistance to push this pole back. However, the above-described technological advances have caused the effectiveness of TIA 105 to decrease, which means that input node 103 is beginning to limit our bandwidth.

Fortunately, as packaging technologies continue to advance, input capacitance is becoming much smaller. In the past, typical optical receivers had 200 fF of input-node capacitance; now they have less than 20 fF. As a consequence, we do not need a TIA as much as we needed it before. Instead, we can manage by simply connecting a passive resistor to the input node of an optical receiver to convert a photocurrent into a voltage. For example, see input resistor R 204, which is coupled to the input of optical receiver 200 illustrated in FIG. 2.

Figure 2:
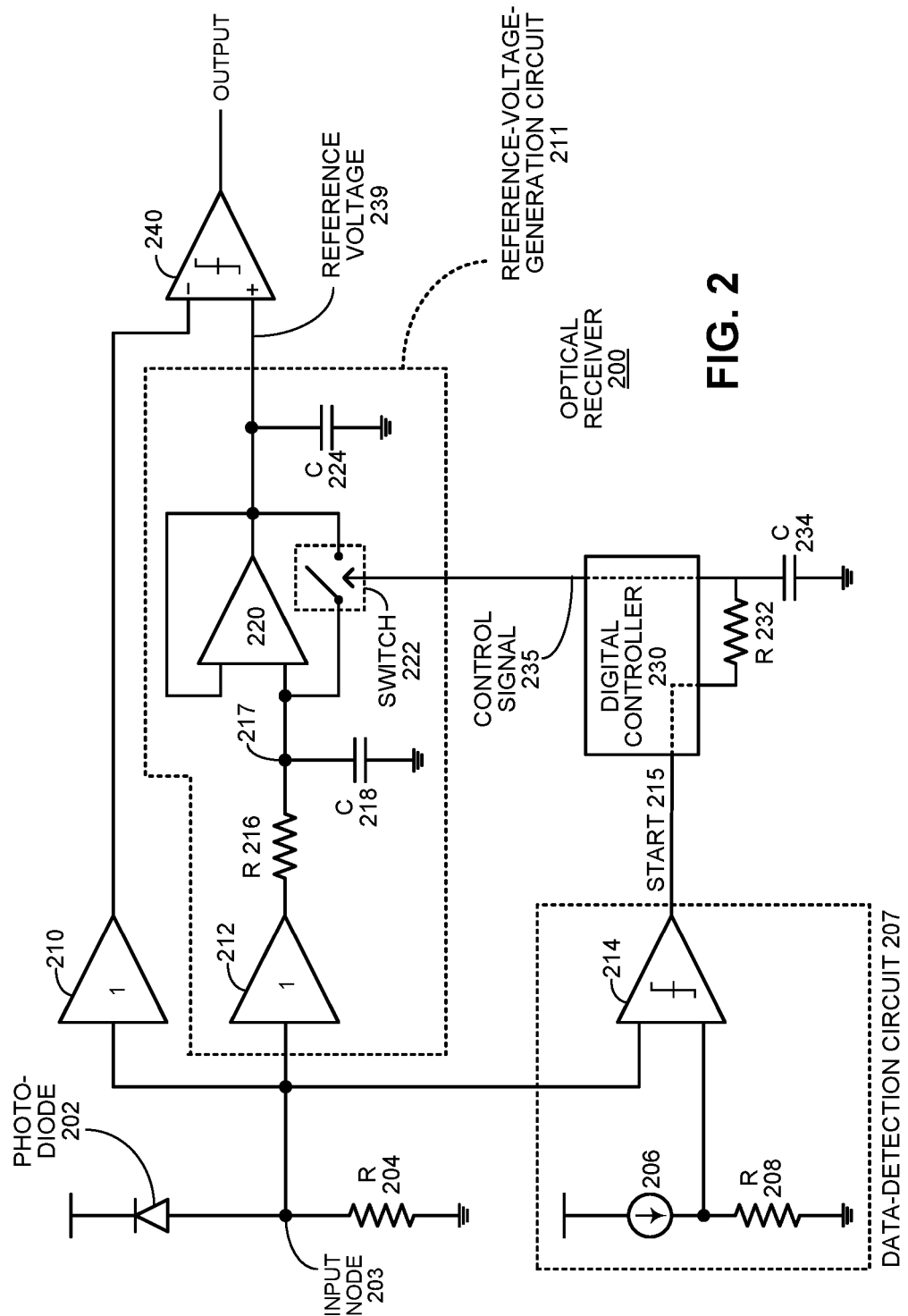
FIG. 2 illustrates an optical receiver that includes a feed-forward circuit that acquires a DC signal level to provide a reference voltage in accordance with the disclosed embodiments.

By doing away with a TIA that contains active gain circuitry, the optical receiver 200 illustrated in FIG. 2 provides a number of advantages. Note that the bias voltage for an amplifier in a TIA needs to be adjusted properly for the TIA to operate correctly. The conventional technique for adjusting this bias voltage involves using a feedback loop. However, a feedback loop has requirements regarding how fast it can be. If we make it too fast, the receiver starts to oscillate. If we make it too slow, the receiver may not be able to keep up with normal changes in bias voltage. So using a passive resistor instead of an active gain stage has the advantage of being less sensitive to changes in the bias point at the input node.

Referring to FIG. 2, a new optical receiver 200, which does not use a TIA, operates as follows. First, optical receiver 200 receives a photocurrent from a photodiode 202 at input node 203. This photocurrent feeds through an input resistor 204, which is coupled to ground, to create an input voltage at input node 203. This input voltage feeds through a unity gain amplifier 210 and into the upper input of a sense-amp (strong arm) 240.

Optical receiver 200 also includes a reference-voltage-generation circuit 211 that is structured as a feed-forward stage, and which generates a reference voltage 239 that feeds into the lower input of sense-amp 240. This reference-voltage-generation circuit 211 includes an adjustable low-pass filter, including a filter resistor R 216 and two filter capacitors C 218 and C 224, which filters the input voltage received from input node 203 to produce reference voltage 239. More specifically, reference-voltage-generation circuit 211 feeds the input voltage received from input node 203 through a unity gain amplifier 212 and then through a filter resistor R 216, into intermediate-filter node 217. Intermediate filter node 217 is coupled to filter capacitor 218 to ground, and is also coupled to the top input of filter amplifier 220. The bottom input of filter amplifier 220 is coupled to the output of filter amplifier 220, which is coupled to ground through filter capacitor 224. The output of filter amplifier 220 produces reference voltage 239, which feeds into the reference-voltage input of sense-amp 240.

Reference-voltage-generation circuit 211 also includes a switch 222, which is coupled between the bottom input of filter amplifier 220 and the output of filter amplifier 220. Switch 222 is actuated by a control signal 235, which is generated by a digital controller 230. During operation, digital controller 230 receives a start signal 215 from a data-detection circuit 207, which detects data on the input voltage signal from input node 203 by comparing the input voltage signal against a threshold voltage generated by a current source 206 and a resistor 208. Digital controller 230 feeds this start signal 215 through a controller resistor 232 and a controller capacitor 234 to produce control signal 235.

During a faster operating mode, which occurs when the data-detection circuit 207 does not detect any data on the input voltage signal, control signal 235 is not asserted. This causes switch 222 to remain open, which means that the output of filter amplifier 220 follows its input regardless of filter capacitor C 224, and hence filter capacitor C 224 does not affect the filtering process. In this case, the time constant $T_1$ for reference-voltage-generation circuit 211 is determined by filter resistor 216, which has a resistance R and filter capacitor 218, which has a capacitance $C_1$. Hence, the time constant $\tau_1 = RC_1$, and the cutoff frequency $f_1$ for reference-voltage-generation circuit 211 is associated with $1/RC_1$.

In contrast, during a slower operating mode, which starts a bias-delay time $t_{BD}$ after data-detection circuit 207 detects data on the input voltage signal, and lasts until data-detection circuit 207 no longer detects data on the input voltage signal, control signal 235 is asserted. This causes switch 222 to open, which allows filter capacitor C 224 to affect the filtering process. In this case, the time constant $T_2$ for reference-voltage-generation circuit 211 is determined by filter resistor R 216, filter capacitor C 218 and filter capacitor C 224, which has a capacitance $C_2$. Hence, the time constant $\tau_2 = R(C_1 + C_2)$, and the cutoff frequency $f_2$ for reference-voltage-generation circuit 211 is associated with $1/R(C_1 + C_2)$, which is slower than $f_1$.

It is advantageous to use a faster cutoff frequency $f_1$ for the low-pass filter in reference-voltage-generation circuit 211 during the preamble of a communication so that reference voltage 239 can rapidly converge to its steady state when the communication link is initially turned on and the signal levels are changing rapidly. However, this faster cutoff frequency $f_1$ can create dithering in reference voltage 239 when data bits are subsequently received. Note that incoming data, which is received after the preamble, is effectively a pseudo-random binary sequence (PRBS), which can contain a long sequence of ones or a long sequence of zeros, which can adversely affect the performance of optical receiver 200 by causing reference voltage 239 to drift up for a long sequence of ones, and down for a long sequence of zeros. Note that by using a balanced encoding scheme, we can ensure that a sequence of consecutive ones or a sequence of zeros has a maximum length. However, even with a balanced scheme, there may be 10 consecutive ones or zeros, and we need to hold the DC bias steady during those 10 bits. In this case, it advantageous to use the slower cutoff frequency $f_2$ to ensure that the DC bias will hold constant across long sequences of consecutive ones or zeros.

Note that filter amplifier 220 can be turned off when switch 222 is turned on, because closing switch 222 effectively eliminates the need for filter amplifier 220. There is typically a few millivolts of mismatch between the input and output of filter amplifier 220 when filter amplifier 220 is turned on, and it is undesirable to have this mismatch after the DC bias voltage is stable. Turning off filter amplifier 220 can kill this mismatch.

Figure 3:
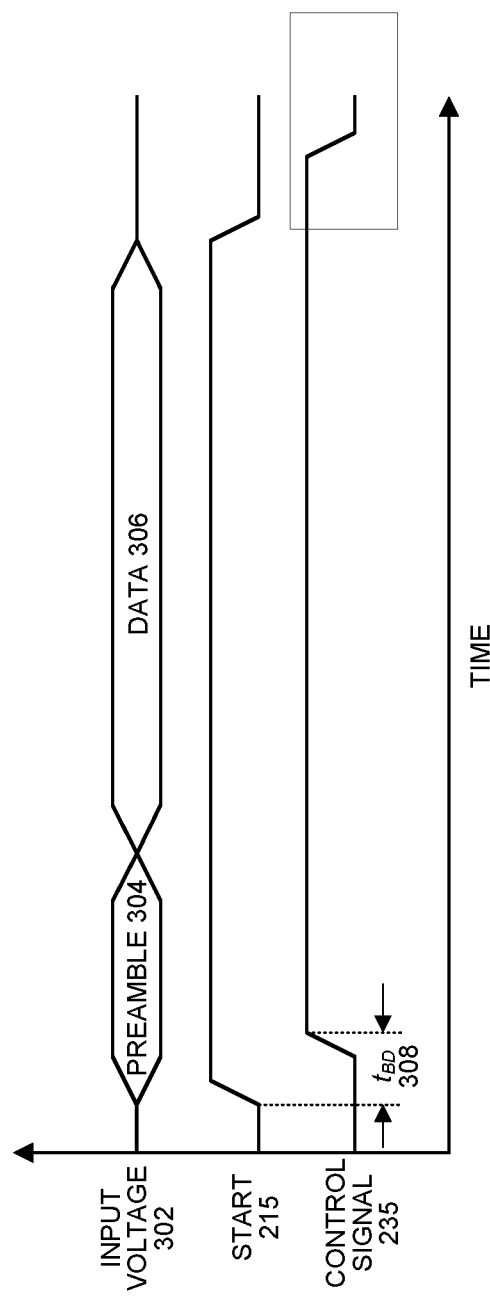
FIG. 3 presents a timing diagram for the circuit illustrated in FIG. 2 in accordance with the disclosed embodiments.

FIG. 3 presents a timing diagram illustrating a few signals that are generated in optical receiver 200 illustrated in FIG. 2. The top signal in the timing diagram is input voltage signal 302, which is generated at input node 203. Note that input voltage signal 302 includes a preamble 304, which is initially transmitted to optical receiver 200 when data transmission starts and before subsequent data transmission 306 commences. The middle signal in the timing diagram is start signal 215, which is generated by data-detection circuit 207 and indicates whether data has been detected on input voltage signal 302. Finally, the bottom signal in the timing diagram is control signal 235 for switch 222, which is generated by digital controller 230 in response to start signal 215. During this process, digital controller 230 uses an RC circuit comprising resistor 232 and capacitor 234 to generate a bias-delay time $t_{BD}$ 308 between when start signal 215 is asserted and when control signal 235 is asserted, to ensure that the DC-bias voltage for sense-amp 240 has stabilized before switch 222 is closed. During this bias-delay time interval $t_{DB}$ 308, reference-voltage-generation circuit 211 operates in the fast operating mode, wherein the cutoff frequency of the low-pass filter is $f_1$, which is associated with $1/RC_1$. This fast operating mode allows the bias voltage for sense-amp 240 to quickly converge. After the time interval $t_{DB}$ 308 elapses, reference-voltage-generation circuit 111 starts operating in the slower operating mode, wherein the cutoff frequency of the low-pass filter is $f_2$, which is associated with $1/R(C_1 + C_2)$. This slower operating mode prevents long sequences of consecutive ones or zeros from adversely affecting the bias voltage when data is being received. When data is no longer being received at input node 203, start signal 215 is de-asserted, and the system is no longer acquiring data, at which point the state of reference-voltage-generation circuit 211 does not matter.

Note that the new low-overhead, burst-mode optical receiver described above makes it practical to implement new switching architectures. For example, the new optical receiver makes it possible to implement optical Ethernet switches, wherein the switching happens completely in the optical domain. (At the present moment, Ethernet switches operate in the electrical domain. This means that other components, such as quad small-form pluggable (QSFP) modules, need to be used to convert from the electrical domain to the optical domain, and then back from the electrical domain to the optical domain.)

Operation of the Optical Receiver

Figure 4A:
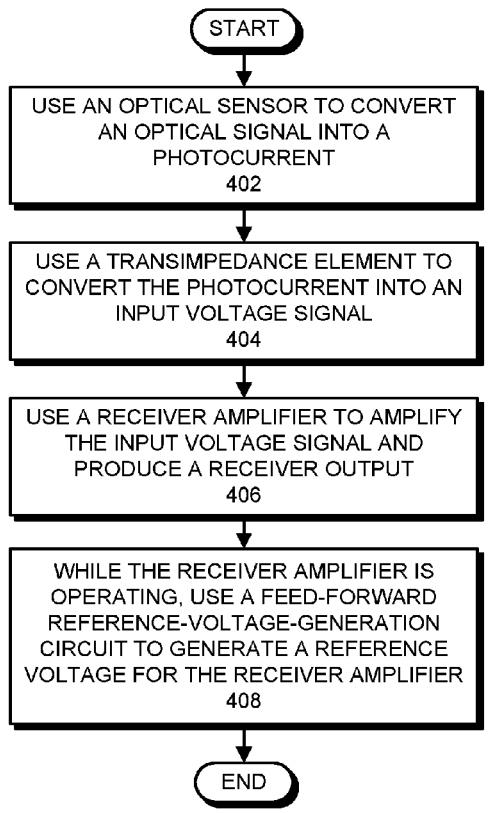
FIG. 4A presents a flow chart illustrating how a burst-mode optical receiver operates in accordance with an embodiment of the present disclosure.

FIG. 4A presents a flow chart illustrating how a circuit that implements a burst-mode optical receiver operates in accordance with an embodiment of the present disclosure. First, the circuit uses an optical sensor to convert an optical signal into a photocurrent (step 402). Next, the circuit uses a transimpedance element to convert the photocurrent into an input voltage signal (step 404). The circuit then uses a receiver amplifier to amplify the input voltage signal and produce a receiver output (step 406). While the receiver amplifier is operating, the system uses a reference-voltage-generation circuit to generate a reference voltage for the receiver (step 408).

Figure 4B:
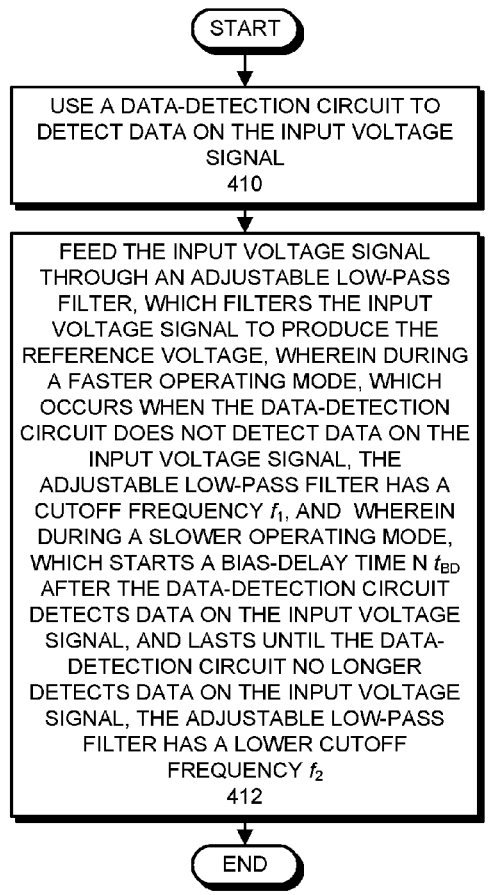
FIG. 4B presents a flow chart illustrating how a reference-voltage-generation circuit generates a reference voltage for an optical receiver in accordance with an embodiment of the present disclosure.

FIG. 4B presents a flow chart illustrating how the reference-voltage-generation circuit generates a reference voltage in accordance with an embodiment of the present disclosure. First, the reference-voltage-generation circuit uses a data-detection circuit to detect data on the input voltage signal (step 410). Next, the reference-voltage-generation circuit feeds the input voltage signal through an adjustable low-pass filter, which filters the input voltage signal to produce the reference voltage (step 412). During a faster operating mode, which occurs when the data-detection circuit does not detect data on the input voltage signal, the adjustable low-pass filter has a cutoff frequency $f_1$. In contrast, during a slower operating mode, which starts a bias-delay time $t_{BD}$ after the data-detection circuit detects data on the input voltage signal, and lasts until the data-detection circuit no longer detects data on the input voltage signal, the adjustable low-pass filter has a lower cutoff frequency $f_2$.

System

Figure 5:
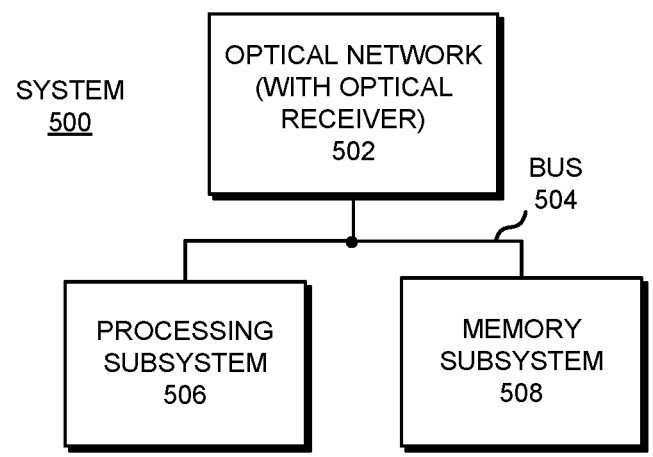
FIG. 5 illustrates a system that includes an optical receiver in accordance with an embodiment of the present disclosure.

One or more of the preceding embodiments of the optical receiver may be included in a system or device. More specifically, FIG. 5 illustrates a system 500 that includes an optical network 502, which includes an optical receiver. As illustrated in FIG. 5, system 500 also includes a processing subsystem 506 (comprising one or more processors) and a memory subsystem 508 (comprising memory).

In general, components within optical network 502 and system 500 may be implemented using a combination of hardware and/or software. Thus, system 500 may include one or more program modules or sets of instructions stored in a memory subsystem 508 (such as DRAM or another type of volatile or non-volatile computer-readable memory), which, during operation, may be executed by processing subsystem 506. Furthermore, instructions in the various modules in memory subsystem 508 may be implemented in: a high-level procedural language, an object-oriented programming language, and/or in an assembly or machine language. Note that the programming language may be compiled or interpreted, e.g., configurable or configured, to be executed by the processing subsystem.

Components in system 500 may be coupled by signal lines, links or buses, such as bus 504. These connections may include electrical, optical, or electro-optical communication of signals and/or data. Furthermore, in the preceding embodiments, some components are shown directly connected to one another, while others are shown connected via intermediate components. In each instance, the method of interconnection, or "coupling," establishes some desired communication between two or more circuit nodes, or terminals. Such coupling may often be accomplished using a number of photonic or circuit configurations, as will be understood by those of skill in the art; for example, photonic coupling, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 500 may be at one location or may be distributed over multiple, geographically dispersed locations.

System 500 may include: a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device.

Moreover, optical network 502 can be used in a wide variety of applications, such as: communications (for example, in a transceiver, an optical interconnect or an optical link, such as for intra-chip or inter-chip communication), a radio-frequency filter, a biosensor, data storage (such as an optical-storage device or system), medicine (such as a diagnostic technique or surgery), a barcode scanner, metrology (such as precision measurements of distance), manufacturing (cutting or welding), a lithographic process, data storage (such as an optical-storage device or system) and/or entertainment (a laser light show).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. An optical receiver, comprising:
   a receiver input that receives a photocurrent from a photosensor;

a transimpedance element coupled to the receiver input, which converts the photocurrent into an input voltage signal;

a receiver amplifier that amplifies the input voltage signal and produces a receiver output; and a reference-voltage-generation circuit that generates a reference voltage for the receiver amplifier, wherein the reference-voltage-generation circuit comprises a feed-forward stage, which includes, a data-detection circuit that detects data on the input voltage signal, and an adjustable low-pass filter, which filters the input voltage signal to produce the reference voltage, wherein during a faster operating mode, which occurs when the data-detection circuit does not detect data on the input voltage signal, the adjustable low-pass filter has a cutoff frequency $f_1$, and wherein during a slower operating mode, which starts a bias-delay time $t_{BD}$ after the data-detection circuit detects data on the input voltage signal, and lasts until the data-detection circuit no longer detects data on the input voltage signal, the adjustable low-pass filter has a lower cutoff frequency $f_2$.

2. The optical receiver of claim 1, wherein the transimpedance element comprises one of:
   a resistor; and
   a transimpedance amplifier (TIA).

3. The optical receiver of claim 1, wherein $f_1$ is less than a frequency of a preamble of a data transmission received on the input voltage signal.

4. The optical receiver of claim 1, wherein $f_2$ is slow enough to ensure that a maximum number of same-sign consecutive bits in a data transmission received on the input voltage signal does not adversely affect reception of data by the optical receiver.

5. The optical receiver of claim 1,
   wherein the adjustable low-pass filter includes a resistance R and two capacitances $C_1$ and $C_2$;
   wherein during the faster operating mode, R and $C_1$ are connected within the adjustable low-pass filter so that the cutoff frequency $f_1=1/RC_1$; and
   wherein during the slower operating mode, R and $C_1$, and $C_2$ are connected within the adjustable low-pass filter so that the cutoff frequency $f_2=1/R(C_1+C_2)$.

6. The optical receiver of claim 1, wherein the adjustable low-pass filter comprises:
   a filter resistor coupled between the receiver input and an intermediate filter node, wherein the filter resistor has a resistance R;
   a first filter capacitor coupled between the intermediate filter node and ground, wherein the first filter capacitor has a capacitance $C_1$;
   a filter amplifier having a first input, a second input and a filter-amplifier output, wherein the first input is coupled to the filter-amplifier output, wherein the second input is coupled to the intermediate filter node, and wherein the filter-amplifier output feeds into a reference-voltage input of the receiver amplifier;
   a second filter capacitor coupled between the filter-amplifier output and ground, wherein the second filter capacitor has a capacitance $C_2$;
   a filter switch coupled between the second input of the filter amplifier and the filter-amplifier output; and
   a controller that receives a data-detected signal from the data-detection circuit, and in response actuates the filter switch to couple the second input of the filter amplifier to the filter-amplifier output.

7. The optical receiver of claim 1, wherein the bias-delay time $t_{BD}$ is sufficiently long to ensure that the reference voltage stabilizes after the data-detection circuit starts detecting data on the input voltage signal.

8. The optical receiver of claim 1, wherein the photosensor comprises a photodiode that converts an optical signal into the photocurrent.

9. The optical receiver of claim 6, wherein the controller turns off the filter amplifier during the slower mode of operation.

10. A system, comprising:
    at least one processor;
    at least one memory coupled to the at least one processor; and
    an optical receiver that facilitates communication of optical signals within the system, wherein the optical receiver includes:
    a receiver input that receives a photocurrent from a photosensor;
    a transimpedance element coupled to the receiver input, which converts the photocurrent into an input voltage signal;
    a receiver amplifier that amplifies the input voltage signal and produces a receiver output; and
    a reference-voltage-generation circuit that generates a reference voltage for the receiver amplifier, wherein the reference-voltage-generation circuit comprises a feed-forward stage, which includes,
    a data-detection circuit that detects data on the input voltage signal, and
    an adjustable low-pass filter, which filters the input voltage signal to produce the reference voltage,
    wherein during a faster operating mode, which occurs when the data-detection circuit does not detect data on the input voltage signal, the adjustable low-pass filter has a cutoff frequency $f_1$, and
    wherein during a slower operating mode, which starts a bias-delay time $t_{BD}$ after the data-detection circuit detects data on the input voltage signal, and lasts until the data-detection circuit no longer detects data on the input voltage signal, the adjustable low-pass filter has a lower cutoff frequency $f_2$.

11. The system of claim 10, wherein the transimpedance element comprises one of:
    a resistor; and
    a transimpedance amplifier (TIA).

12. The system of claim 10, wherein $f_1$ is less than a frequency of a preamble of a data transmission received on the input voltage signal.

13. The system of claim 10, wherein $f_2$ is slow enough to ensure that a maximum number of same-sign consecutive bits in a data transmission received on the input voltage signal does not adversely affect reception of data by the optical receiver.

14. The system of claim 10,
    wherein the adjustable low-pass filter includes a resistance R and two capacitances $C_1$ and $C_2$;
    wherein during the faster operating mode, R and $C_1$ are connected within the adjustable low-pass filter so that the cutoff frequency $f_1=1/RC_1$; and
    wherein during the slower operating mode, R and $C_1$, and $C_2$ are connected within the adjustable low-pass filter so that the cutoff frequency $f_2=1/R(C_1+C_2)$.

15. The system of claim 10, wherein the adjustable low-pass filter comprises:
- a filter resistor coupled between the receiver input and an intermediate filter node, wherein the filter resistor has a resistance R;
- a first filter capacitor coupled between the intermediate filter node and ground, wherein the first filter capacitor has a capacitance $C_1$;
- a filter amplifier having a first input, a second input and a filter-amplifier output, wherein the first input is coupled to the filter-amplifier output, wherein the second input is coupled to the intermediate filter node, and wherein the filter-amplifier output feeds into a reference-voltage input of the receiver amplifier;
- a second filter capacitor coupled between the filter-amplifier output and ground, wherein the second filter capacitor has a capacitance $C_2$;
- a filter switch coupled between the second input of the filter amplifier and the filter-amplifier output; and
- a controller that receives a data-detected signal from the data-detection circuit, and in response actuates the filter switch to couple the second input of the filter amplifier to the filter-amplifier output.

16. The system of claim 10, wherein the bias-delay time $t_{BD}$ is sufficiently long to ensure that the reference voltage stabilizes after the data-detection circuit starts detecting data on the input voltage signal.

17. The system of claim 10, wherein the photosensor comprises a photodiode that converts an optical signal into the photocurrent.

18. The system of claim 15, wherein the controller turns off the filter amplifier during the slower mode of operation.

19. A method for receiving an optical signal, comprising:
- using an optical sensor to convert the optical signal into a photocurrent;
- using a transimpedance element coupled to the receiver input to convert the photocurrent into an input voltage signal;
- using a receiver amplifier to amplify the input voltage signal and produce a receiver output; and
- while the receiver amplifier is operating, generating a reference voltage for the receiver amplifier by using a feed-forward reference-voltage-generation circuit to generate a reference voltage for the receiver amplifier, wherein generating the reference voltage involves:
  - using a data-detection circuit to detect data on the input voltage signal, and
  - feeding the input voltage signal through an adjustable low-pass filter, which filters the input voltage signal to produce the reference voltage,
  - wherein during a faster operating mode, which occurs when the data-detection circuit does not detect data on the input voltage signal, the adjustable low-pass filter has a cutoff frequency $f_1$, and
  - wherein during a slower operating mode, which starts a bias-delay time $t_{BD}$ after the data-detection circuit detects data on the input voltage signal, and lasts until the data-detection circuit no longer detects data on the input voltage signal, the adjustable low-pass filter has a lower cutoff frequency $f_2$.

20. The method of claim 19,
wherein the adjustable low-pass filter includes a resistance R and two capacitances $C_1$ and $C_2$;
wherein during the faster operating mode, R and $C_1$ are connected within the adjustable low-pass filter so that the cutoff frequency $f_1 = 1/RC_1$; and
wherein during the slower operating mode, R and $C_1$, and $C_2$ are connected within the adjustable low-pass filter so that the cutoff frequency $f_2 = 1/R(C_1+C_2)$.

* * * * *

UNITED STATES PATENT AND TRADEMARK OFFICE
CERTIFICATE OF CORRECTION

PATENT NO. : 9,935,718 B1
APPLICATION NO. : 15/369568
DATED : April 3, 2018
INVENTOR(S) : Saeedi et al.

Page 1 of 1

It is certified that error appears in the above-identified patent and that said Letters Patent is hereby corrected as shown below:

In the Specification

In Column 2, Line 57, after "signal" insert -- . --.

In Column 5, Line 45, delete "$T_1$" and insert -- $\tau_1$ --, therefor.

In Column 6, Line 53, delete "111" and insert -- 211 --, therefor.

Signed and Sealed this
Twenty-eighth Day of August, 2018

Andrei Iancu
*Director of the United States Patent and Trademark Office*